July 16, 1963
L. M. DEAN ET AL
3,097,899
INSULATED BUTTER DISPENSER
Filed Oct. 24, 1961
FIG. I
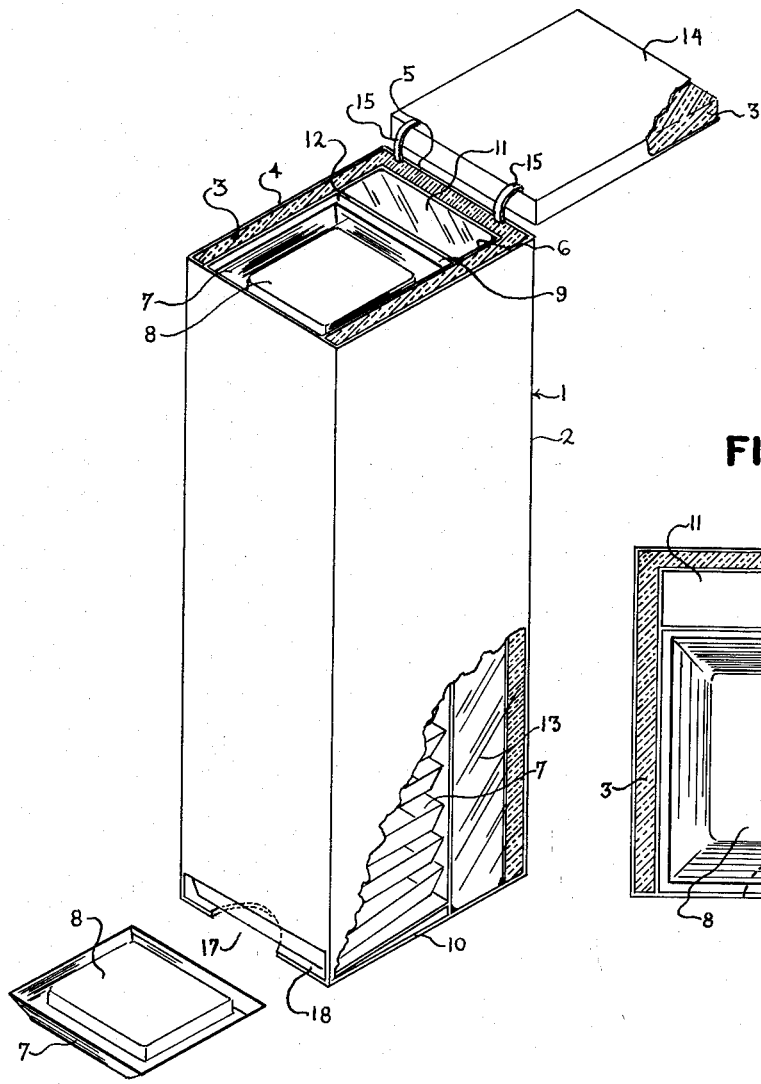
FIG. II
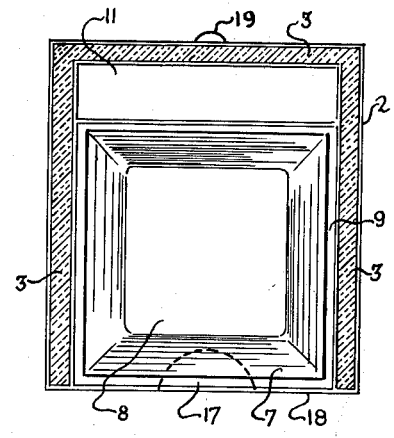
Inventors
LESTER M. DEAN
and WILLIAM D'ESOPO
by James J. Ralabate
Attorney

United States Patent Office 3,097,899
Patented July 16, 1963

3,097,899
INSULATED BUTTER DISPENSER
Lester M. Dean, 167 Newburgh Ave., Buffalo 15, N.Y., and William D'Esopo, 405 Capen Blvd., Eggertsville, N.Y.
Filed Oct. 24, 1961, Ser. No. 147,266
2 Claims. (Cl. 312—36)

This invention relates to butter dispensing means. More particularly, the inventive concept herein resides in a butter dispensing device simplified in structure and easy to operate.

The present procedure in preparing butter pats for use, is generally to cut the butter into pats, cover each pat with a piece of wax paper, and pile these butter portions during refrigeration. When it is desired to use the butter pats, each is separated from the pile of pats, and individually carried to the plate to await use by the ultimate consumer. It has not only been not convenient and awkward to remove each pat from refrigeration, but it is generally agreed that a more sanitary method of serving butter pats is desirable. To provide the butter closer to the serving counter, the butter pats have been placed in a large vessel filled with ice and/or water and said vessel is placed in the immediate vicinity of the serving counter or tables. Each pat then is removed by the waiter by reaching into the vessel and removing the butter. This practice is extremely unsanitary in that the butter is exposed to the atmosphere and the usually contaminated exposed water and ice. Therefore there has been a pressing need for improved methods or means for serving butter pats or chips.

The device of this invention provides a means for conveniently storing and refrigerating butter pats together with the bonus of conveniently locating the source of the butter pats close to the serving counter or tables. The present butter dispenser is characterized by a design which admits of economical manufacture, and provides a sanitary, and convenient process of serving butter pats. The present device comprises a dispenser having a center chamber for containing a plurality of butter pats, a means for retaining said butter pats in a cool state, insulation for said container, and a convenien tbutter removal portion. The device is comparatively small in size and may easily be positioned in any manner close to the serving means. The butter thus need only be removed just prior to the time it is to be consumed, without any danger of contamination. The butter pats remain when in the device of this invention in a chilled or cold state, completely enclosed without any necessity of contact with the atmosphere or water or ice.

It is therefore an object of this invention to provide a butter dispenser which admits of economical manufacture and the resting of a plurality of pats compactly for convenient handling by waiters or waitresses.

A further object of this invention is to provide a dispenser whereby the butter pats may be available individually without touching or contaminating the other butter pieces adjacent thereto.

Another object is to provide a butter dispenser adapted to retain butter pats in a chilled condition without the need for ice or water in contact therewith.

A still other object of this invention is to provide a butter dispenser whereby the butter can be retained fresh and hard, and pats can be easily removed without the necessity of contact with the hands of the person removing same.

Still another object of this invention is to provide a butter dispenser having integral therewith a chamber for retaining a cartridge type refrigerant, easily removed and inserted when desired. The butter stacked in a vertical column is positioned into the dispenser, and each removed individually from the bottom when desired.

The following illustrations will more specifically define the particulars of this invention. Although the drawing illustrates the preferred embodiment of this invention, the specifics shown are meant to be illustrative only and not limiting of this invention.

FIGURE I illustrates a perspective view of the dispenser of this invention with the cover raised.

FIGURE II illustrates a top plan view and horizontal section of the dispenser.

Referring first to FIGURE I, dispenser 1 comprises an elongated shell container 2 constructed preferably of metal or other suitable materials such as ceramics, plastics, wood and the like. The inner peripheral portion of said container 2 has positioned immediately adjacent thereto insulation means 3. This insulation may comprise conventional type insulators such as glass fiber, asbestos, synthetic foams, aluminum or metal fiber, and the like. The insulation 3 may be positioned if desired on all wall portions of the container 2; it has been found however that it is preferred to have insulation only on the two side walls 4 and back wall portion 5. The insulation means 3 extends longitudinally downwardly to enclose substantially the entire inner area of wall means 4 and 5. Inner retaining wall 6 retains insulation means 3 in position and also provides a smooth surface allowing butter pat cardboards 7 (or other butter containers) to effectively slide downwardly when the lowest butter pat is removed from the container. The retaining wall 6 is U-shaped in cross-section and may be constructed of any suitable material such as metals, plastics, and the like. The material used as retaining wall 6 should be very low in temperature sensitivity, and preferably substantially non-reactive with moisture, and most chemical refrigerants. The butter pats 8 are positioned on cardboard trays or other containing means 7; these containing means and butter pats are piled or stacked vertically in butter compartment or chamber 9. The size of butter compartment 9 is slightly greater than the size of the peripheral portion of containing means 7. The compartment 9 may be inclined slightly forward at its bottom wall portion 10, thereby allowing the butter pats to more easily slide downwardly and outwardly when the bottom-most butter pat is removed. It should be understood however that it would not be without the spirit of this invention to construct bottom wall 10 on a plane even with a flat support or parallel to the top plane portion of the container. Positioned intermediate said butter compartment 9 and refrigerant compartment 11 is a wall 12. Wall 12 should be very thin in cross-section or should be a reticulated structure to insure an effective cooling transfer from refrigerant compartment 11 to butter compartment 9. Suitable materials may be wire meshes, plastic meshes, foils both metallic and plastic, glass fiber, and the like. The wall 12 may be if desired, an apertured solid wall, a crisscrossed grid-like wall, or a weaned wall having large open areas thereby allowing the cold air to easily pass into butter compartment 9. Immediately adjacent to wall 12 and projecting backwardly therefrom is refrigerant compartment 11. Refrigerant compartment 11 is adapted to receive and support a refrigerant means 13. It is preferred that refrigerant means 13 be of the type contained in a polyethylene bag or the like and having an extended cooling life. These bag contained refrigerants 13 may be easily inserted and removed from the container 2. When the cooling effect of refrigerant 13 has diminished, the bag of refrigerant is removed, frozen, and reused when desired. The refrigerant 13 extends downwardly through substantially the height of the container and maintains an even and constant cooling effect throughout the container 2. There are many types of refrigerants that may be used, of course while non-toxic refrigerants are preferred, the refrigerant will be sealed in an air and liquid tight container or bag. Thus conventional type refrigerants (frozen) may be used if desired such as propylene glycol, methane, ethane, ethylene, carbon dioxide (Dry Ice), propylene, propane, Freons (such as Freon 11, 21, 22, 113, 114); Freons are fluorine derivatives of hydrocarbons. Other suitable refrigerants are ammonia, methyl chloride, isobutane, sulfur dioxide, methylamine, butane, ethyl chloride, ethylamine, methyl formate, ethyl ether, methylene chloride, dichloroethylene, trichloroethylene, and water (ice). The top portion of container 2 is provided with a top closure means 14 connected to container 2 by hinge means 15. Top lid 14 is opened to insert the butter pats into butter chamber 9, and closed after the container is supplied with the desired amount of butter pats. At the front bottom portion of container 2 is located a finger cut out 17 which allows containing means with butter pats thereon to be easily pulled out of the container. A slot 18 is provided having a height slightly in excess of the height of the butter pat, to allow the container 7 and pat 8 to be removed without contact with the wall means of container 2. Slot 18 is provided only in the front wall portion of container 2, so as to allow easy terminal exit means while retaining a high degree of refrigeration of the butter.

FIGURE II illustrates a top view of container 2 without the lid portion 14. Insulation means 3 extends around the peripheral portion of container 2 excepting front portion 18. Wall or partition 12 separates and forms compartments 11 (refrigerant compartment) and 9 (butter compartment). Positioned in the bottom portion of container 2 is a finger cut out 17 provided to allow easy removal of butter support or container 7. It will be noted that container 7 overlaps the curvature of cut out 17 and may be easily grasped thereby. Means 19 may be provided as a structure for hanging dispenser 1 on a wall or other structure. This invention comprises a butter dispenser adapted to support and house a plurality of separated butter pats comprising in combination an insulated box-like structure, a top closure means for said box-like structure, and a butter pat removal means, said insulated box-like structure comprising therein a butter chamber, a chamber dividing wall, and a refrigerant chamber, said chamber dividing wall being positioned intermediate of said butter chamber and said refrigerant chamber, said refrigerant chamber being substantially parallel with and adjacent to said butter chamber, said butter removal means being disposed in the bottommost portion of said butter chamber and extending from the internal portion of said butter chamber to the atmosphere, said dividing wall having a plurality of openings therein extending through said wall into both said refrigerant chamber and said butter chamber, said top closure means having insulating means therein and adapted to substantially completely cover said box-like structure, said butter removal means comprising a slot positioned in and across substantially the width of the entire front portion of said box-like structure, the side wall of said box-like structure opposite to the side wall containing said butter removal means comprising an attachment means adapted to hang and suspend said butter dispenser on a desired support, said attachment means comprising an apertured tab extending upwardly and outwardly from the top portion of said dispenser.

The prior art practice of carrying each butter pat individually to the consumer was time consuming and expensive in man hours and leaves much to be desired.

Other problems incident to serving any food stuff such as optimum sanitary conditions, freshness and the like are solved by the structure of this invention. As above mentioned, some attempts have been made to solve these problems relating to serving butter pats by depositing a random number of pats in a bowl or vessel filled with ice or/and water, but such expedients add to the expense and sanitary problems, and have not proved completely successful from all standpoints.

While we have described our invention hereinabove with respect to various specifics, illustrations, and operating details, it will be obvious to those skilled in the art that our invention is not limited to such details, but may be modified to many variations using the basic concept of this invention. These modifications are intended to be included within the scope of this invention.

We claim:
1. In a refrigerated dispenser for butter pats, the combination of a rectangular, vertically elongated container; a layer of insulation extending around the inside of said container and covering the back and side walls thereof; an elongated inner wall within said container and spaced from the side walls and back thereof, said inner wall serving to retain said insulation in place and to provide a rectangular space within said container; a transverse partition within said space and extending between the sides of said inner wall dividing said space into a refrigeration chamber and a butter storage chamber, said partition being adapted to permit heat transfer between said chambers; and an insulated cover for the top of said container, the front of said container being provided adjacent the bottom thereof with an opening adapted for dispensing butter pats on individual trays without contact with the butter.

2. In a refrigerated dispenser for butter pats, carried on individual trays, the combination of a rectangular vertically elongated container adapted to hold a plurality of said butter pats, said container having a front, back, sides, a pivotally mounted, insulated top closure, and a bottom; an inner wall, substantially U-shaped in cross-section, within said container and spaced from the back and sides thereof, said inner wall having the open end of said U disposed toward and in contact with the front of said container and extending from the bottom of said container substantially to the top thereof; heat insulation filling the space between said inner wall and the back and sides of said container; a partition arranged transversely within said container, said partition extending from the bottom of said container substantially to the top thereof and forming with said inner wall a vertically disposed butter storage chamber adjacent the front of said container and a refrigeration chamber adjacent the back of said container, said partition being so constructed as to facilitate heat transfer between said chambers; said front of said container having a transverse opening adjacent the bottom of said container for withdrawal of butter pats on said individual trays without contact with the butter, and said bottom having a cut-away portion adjacent the front thereof permitting finger contact with the bottom of the lowermost of said trays.

References Cited in the file of this patent

UNITED STATES PATENTS

| | | |
|---|---|---|
| 1,651,858 | Wilkinson | Dec. 6, 1927 |
| 1,736,057 | Smith | Nov. 19, 1929 |
| 2,860,941 | Fromwiller | Nov. 18, 1958 |
| 2,486,973 | Ostinelli | Nov. 1, 1949 |